(12) United States Patent  
Browne et al.

(10) Patent No.: US 7,761,974 B2  
(45) Date of Patent: Jul. 27, 2010

(54) RECONFIGURABLE FIXTURE DEVICE AND METHODS OF USE

(75) Inventors: Alan L. Browne, Grosse Pointe, MI (US); Douglas M. Linn, Commerce Township, MI (US); Nilesh D. Mankame, Ann Arbor, MI (US); Roland J. Menassa, Macomb, MI (US); Ivan G. Sears, Rochester Hills, MI (US); Robin Stevenson, Bloomfield, MI (US); Christopher P. Henry, Newbury Park, CA (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1226 days.

(21) Appl. No.: 11/335,190

(22) Filed: Jan. 19, 2006

(65) Prior Publication Data

US 2006/0156535 A1    Jul. 20, 2006

Related U.S. Application Data

(60) Provisional application No. 60/645,263, filed on Jan. 19, 2005.

(51) Int. Cl.
*B21D 37/16* (2006.01)
*B23Q 7/00* (2006.01)
*B23Q 17/00* (2006.01)
*B23P 17/00* (2006.01)

(52) U.S. Cl. .................. 29/559; 29/405; 29/421.1; 72/342.3; 72/342.4; 72/342.7; 269/310

(58) Field of Classification Search .............. 29/405, 29/421, 447, 559; 72/62, 342.1, 342.3, 342.4, 72/342.7; 148/402, 563; 249/134; 264/219, 264/337; 269/310; 403/28; 428/616
See application file for complete search history.

(56) References Cited

U.S. PATENT DOCUMENTS

| | | | | |
|---|---|---|---|---|
| 4,753,689 A * | 6/1988 | Rizzo et al. | ............... | 148/563 |
| 5,757,833 A * | 5/1998 | Arakawa et al. | ......... | 372/45.01 |
| 5,759,090 A * | 6/1998 | Kawate et al. | ............... | 451/56 |
| 6,102,933 A * | 8/2000 | Lee et al. | ................ | 606/209 |
| 6,133,547 A * | 10/2000 | Maynard | ................ | 219/209 |
| 6,986,855 B1 * | 1/2006 | Hood et al. | ................ | 264/219 |
| 2007/0163686 A1 * | 7/2007 | Zhang et al. | ................ | 148/563 |

* cited by examiner

*Primary Examiner*—David P Bryant
*Assistant Examiner*—Alexander P Taousakis
(74) *Attorney, Agent, or Firm*—Cantor Colburn LLP

(57) ABSTRACT

A process generally includes contacting a surface of at least one workpiece with a reconfigurable pad of a fixture device, wherein the reconfigurable pad comprises a shape memory material configured to conform to the surface of the at least one workpiece, and fixturing the contacted workpiece.

17 Claims, 5 Drawing Sheets

RECONFIGURABLE FIXTURE DEVICE AND METHODS OF USE

CROSS REFERENCE TO RELATED APPLICATIONS

The present application relates to, and claims the benefit of, U.S. Provisional Patent Application No. 60/645,263, which was filed on Jan. 19, 2005 and is incorporated herein in its entirety.

BACKGROUND

The present disclosure generally relates to a flexible manufacturing system and, more particularly, to a reconfigurable fixture device for clamping and/or providing support for a variety of different workpiece configurations.

The advent of assembly lines has enabled rapid, mass production of products at a reduced product cost. Assembly lines typically include multiple operation stages and component, material, or sub-assembly inputs. Sometimes the workpieces are similar or related part shapes. Other times, the workpieces are of unrelated design but require similar manufacturing operations. In these varied applications, the fixture reconfiguration or changeover from one part design to another has to be fast enough to meet the productivity requirements of current manufacturing systems.

Previous efforts in designing and developing flexible fixturing for either small batch manufacture or mass production scenarios can generally include the use of modular fixtures and conformable fixtures. Modular fixturing generally includes fixtures assembled from a standard library of elements such as V-blocks, toggle clamps, locating blocks, and the like. Their flexibility lies in the ability to be reconfigured either manually or by a robotic device. However, modular fixtures have no intrinsic ability to adapt to different sizes and shapes of parts within a part family. In addition, the time necessary for reconfiguration is long. As a result, modular fixtures are more suited to a job shop environment than mass production.

The advent of Flexible Manufacturing Systems (FMS) in the early 1960's provided the impetus for work on conformable fixturing. A conformable fixture is defined as one that can be configured to accept parts of varying shape and size. Conformable fixture technology generally includes encapsulant or mechanistic techniques. Examples of encapsulant fixtures are found in the aerospace industry, where low melting-point metals are used to enclose turbine blades and produce well-defined surfaces for part location and clamping for grinding operations. While an excellent means of facilitating the holding of complex parts, encapsulation is a costly and time-consuming process.

Mechanistic fixtures reported in the literature include the use of petal collets, programmable conformable clamps, a programmable/multi-leaf vise, and an adjustable integral fixture pallet. Of the four, the adjustable integral fixture pallet concept appears to be the most capable of accommodating a part family of castings. To date, however no feasibility studies have been conducted regarding the applicability of any of these techniques to production machining operations.

One troublesome area in flexible manufacturing systems is its implementation in body shops. Clamps are typically employed to clamp the various sheet metal workpieces (e.g., body panels) during assembly and clamping can potentially scratch the exposed surface and/or locally deform the workpiece or surface coating, affecting its aesthetic quality. While, ideally, clamping could be performed on flanges or surfaces that are invisible or immaterial to end users, some clamping inevitably occurs on surfaces whose quality is important aesthetically.

Current clamps utilized in assembly lines generally include a metal (e.g., tool steel) clamp block, which accurately matches the contours of the workpiece and a matching pressure foot. In operation, the clamp block with a contoured surface supports the exterior surface of the workpiece while the pressure foot contacts the inner (non-exposed) surface. As a result, the contour of each clamp block is generally specific to a limited number of workpieces. In dedicated facilities, the contours of the clamp block are generally fabricated by numerically controlled (NC) machining using data generated from the workpiece to be fixtured. A problem arises if multiple models having significantly different workpiece configurations are to be produced on the same tooling setup. Multiple clamp blocks having different contours are then required to accommodate the multiplicity of workpiece configurations.

Clamps with a compliant pad and a matching pressure foot are also used in assembly lines for fixturing workpieces with aesthetically important surfaces. In operation, the clamp block with a contoured surface supports the exterior surface of the workpiece while the pressure foot contacts the inner (non-exposed) surface. The compliance of the clamp block ensures that the surface is not marked and the rigidity of the pressure foot ensures that the location of the part is known completely (to within the tolerance imposed by the deformation of the part under the clamp loads), i.e., the part is not floating with regard to the clamp block. With this approach, minor differences between the shape of the workpiece and the clamp block geometry can be accommodated without introducing local deformation. As a result, the contour of each clamp block is generally specific to a limited number of workpieces. In dedicated facilities, the contours of the clamp block are generally fabricated by numerically controlled (NC) machining using data generated from the workpiece to be fixtured. A problem arises if multiple models are produced having significantly different workpiece configurations. Multiple clamp blocks having different contours are then required to accommodate the multiplicity of workpiece configurations.

Accordingly, there remains a need for a reconfigurable fixture device that can provide adequate support and/or clamping means for a variety of workpiece configurations.

BRIEF SUMMARY

Disclosed herein are processes related to a reconfigurable fixture device for clamping and/or providing support for a variety of different workpiece configurations. In one embodiment, a process generally includes contacting a surface of at least one workpiece with a reconfigurable pad of a fixture device, wherein the reconfigurable pad comprises a shape memory material configured to conform to the surface of the at least one workpiece and fixturing the contacted workpiece.

In another embodiment, a process includes contacting a first surface of a first workpiece with a reconfigurable pad of a fixture device, wherein the reconfigurable pad comprises a shape memory material configured to conform to the first surface of the first workpiece; fixturing the contacted first workpiece; conforming the reconfigurable pad of the fixture device to a second surface of a second workpiece; contacting the second surface of the second workpiece with the reconfigurable pad of the fixture device; and fixturing the second workpiece.

In yet another embodiment, a process for conforming a reconfigurable pad of a fixture device to a surface of at least one workpiece comprises heating the reconfigurable pad effective to increase a temperature of a shape memory material to or above a shape setting temperature; applying a force to the reconfigurable pad effective to deform the reconfigurable pad from an original shape to a shape conforming to the surface of the at least one workpiece; and cooling the shape memory material below the shape setting temperature.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Disclosed herein are reconfigurable fixture devices for providing support and/or securement of a variety of dissimilar workpieces such as may be desired for a flexible manufacturing system. Suitable workpieces for loading onto the fixture device are those that are sufficiently rigid so as not to flex or distort under the weight of the workpiece or by any clamping force (which can be as high as 500 pounds distributed over roughly 1 square inch) when using the fixture device. Although reference will be made to its use in fixturing body panels for motor vehicles (e.g., cars, trucks, motorcycles, boats, airplanes, and the like), it should be understood that the reconfigurable fixture devices could be employed for a variety of end use applications where it may be desirable to support and/or clamp dissimilar workpieces using the same tooling setup without requiring manual adjustment or reprogramming. For example, the reconfigurable fixture devices can be employed for fixturing thin walled and/or thick walled objects, contoured and/or planar objects, on exterior surfaces as well as on hidden surfaces, and the like.

It will be apparent to those skilled in the art in view of this disclosure that the reconfigurable fixture devices disclosed herein can advantageously be used on exposed surfaces of body panels without marring, scratching, and/or causing local deformations such as may be required for assembly of parts having Class A surfaces. Class A surfaces are generally external surfaces that are visible to an end user (e.g., a door, fender, hood, trunk, hull, interior trim, and the like). In contrast, Class B and C surfaces are generally surfaces not normally seen by the end user and have fewer requirements in terms of tangency and surface defects.

Figure 6:
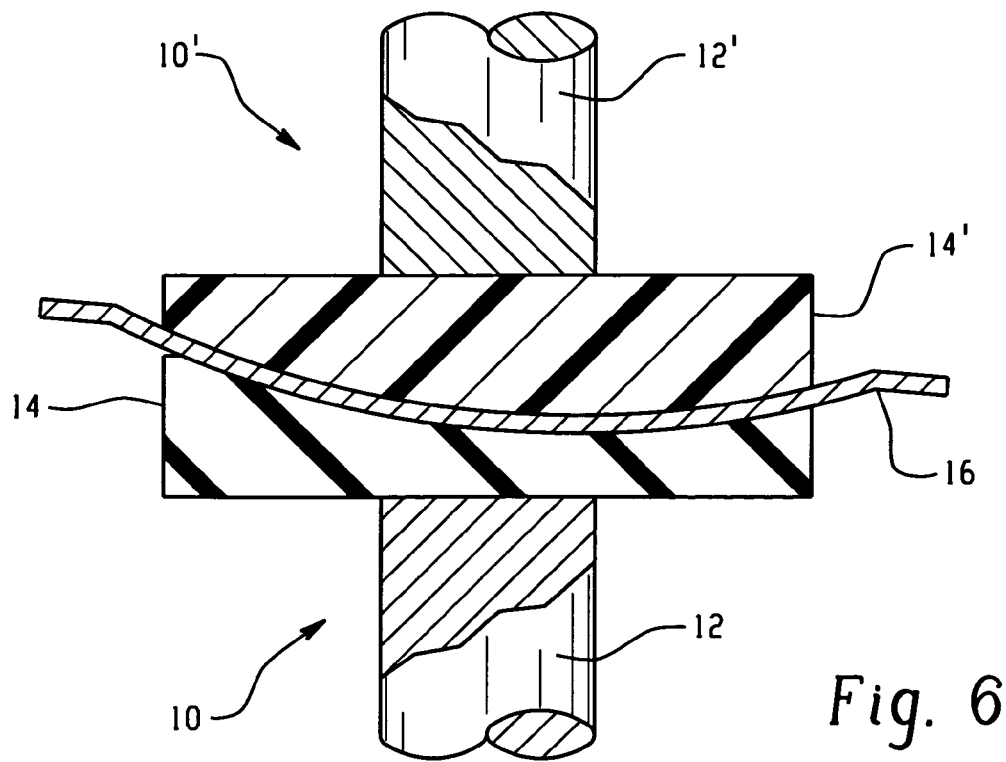
FIG. 6 is a cross sectional view of a fixture device adapted for gripping and/or clamping a workpiece, wherein the respective reconfigurable pads are set to conform to the surface of the workpiece.
Figure 7:
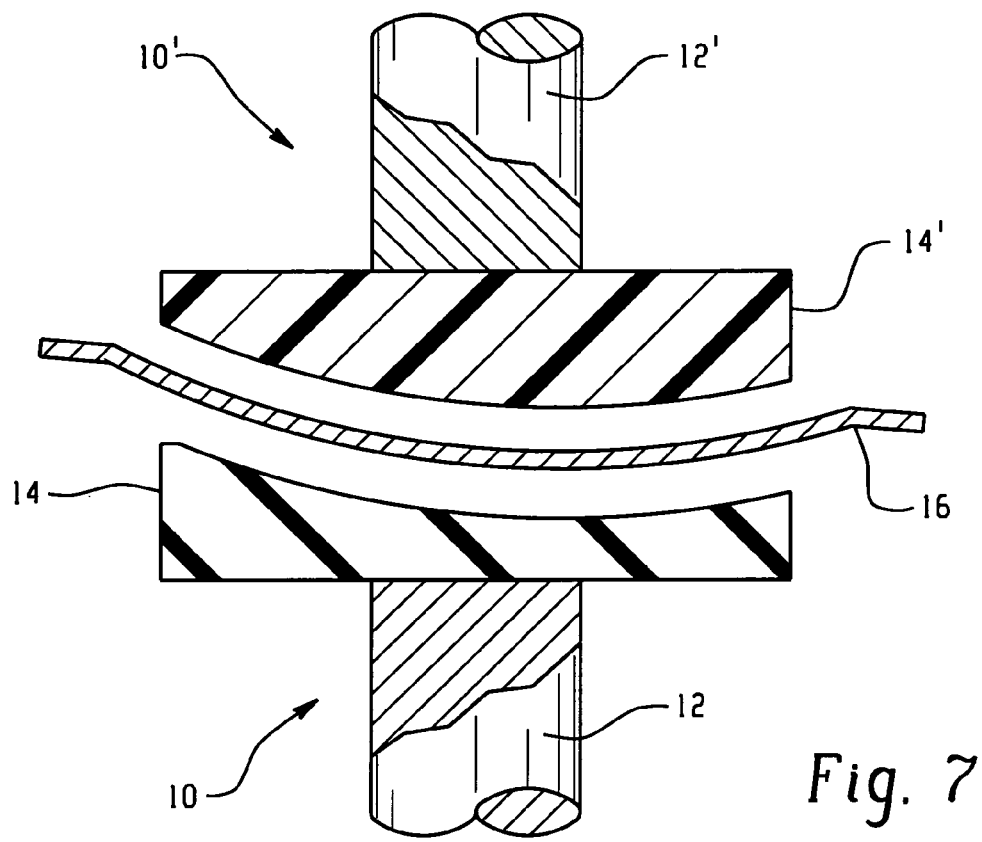
FIG. 7 is a cross sectional view of the fixture device of FIG. 6 upon release of the workpiece.

Referring now to FIGS. 1-9, there are shown cross-sectional views of exemplary reconfigurable fixture devices, generally designated by reference numeral 10, in varying types and/or stages of fixturing. The reconfigurable fixture device 10 can be employed as a supporting device (e.g., as shown in FIGS. 1-5 and 8-9) or as a clamping device (e.g., as shown in FIGS. 6-7) depending on the desired application. As such, the term "fixture device" includes devices intended for clamping applications as well as for supporting applications.

Also, the terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges reciting the same quantity or physical property are inclusive of the recited endpoints and independently combinable.

The reconfigurable fixture device 10 for clamping and/or supporting workpieces 16 generally includes a base member 12 upon which is disposed a reconfigurable pad 14. The fixture device 10 can be fixed in space such as by hard tooling or may be adapted for use with programmable multi-axis tooling device (e.g., robotics, and the like). In supporting applications (i.e., FIGS. 1-5 and 8-9), the fixture device 10 includes a (i.e., at least one) reconfigurable pad 14, which can be utilized during processing to support the workpiece. Alternatively, in clamping applications (FIGS. 6-7), a (i.e., at least one) pair of opposing pads (e.g., one for a clamp block and one for an opposing pressure foot) are employed, wherein one or both of the pads are reconfigurable in the manner that will be described in greater detail below. For example, a fixture device can be employed for clamping a workpiece 16 in which only the pad contacting the Class-A surface of the workpiece is reconfigurable while the opposing pad that contacts a non-Class A surface is not. In other clamping application embodiments, such as those shown in FIGS. 6-7, it may be desirable that both pads are reconfigurable.

Hereinbelow, for convenience, when reference is made to a reconfigurable pad 14, the reconfigurable pad 14 being described may be the reconfigurable pad 14 used for a supporting fixture device 10 and/or it may be one or both (depending on the application) of the opposing reconfigurable pads 14 used for a clamping fixture device 10.

Optionally, the base member 12 may have a plurality of reconfigurable pads 14 disposed thereupon. One or more than one of the plurality of reconfigurable pads 14 may be used to fixture a single workpiece 16 at the same time. In one embodiment, each of the reconfigurable pads 14 is indexed (i.e., each of the plurality of reconfigurable pads 14 can be configured to a specific range of workpiece 16 shapes) and the base member 12 may be rotated or moved to place the appropriately indexed reconfigurable pad 14 in position to fixture the workpiece 16.

Optionally, the fixture device 10 further comprises a locator pin 15 disposed on the base member 12, within and/or adjacent to the reconfigurable pad 14. The locator pin 15 desirably remains in a fixed position with respect to the base member 12. The locator pin 15 can be used to provide information as to the location of the workpiece 16 during operation of the fixture device 10.

The base member 12 can be constructed of any material onto which the reconfigurable pad 14 can be disposed, and which can withstand at least a portion of the weight of the workpiece 16. For example, the base member may be formed from a metal, alloy, ceramic, and the like.

The reconfigurable pad 14 comprises a shape memory material that is adapted to selectively conform to a surface contour of the workpiece 16 disposed thereon in response to an activation signal. Advantageously, the reconfigurable pad 14 can be restored to its original shape as may be desired as well as be reconfigured to accept a different workpiece 16 surface contour, thereby providing versatility to the fixture device 10 and overcoming the problems noted in the prior art. Optionally, the reconfigurable pad 14 may be thermally insulated from the tooling (i.e., base member 12) that it is mounted on and/or a training surface or work piece (e.g. 16) to avoid the quenching influence of any associated thermal mass. An alternative to insulating the reconfigurable pad 14 from the training surface (i.e., to which the reconfigurable pad 14 will conform) is to maintain the training surface at the training or conforming temperature ($T_t$) during the training (i.e., shape setting or conforming) step as will be described in greater detail below.

The reconfigurable pad 14 can be of any shape or size, provided that it can selectively conform to the surface contour of the workpiece 16. For example, the reconfigurable pad may be a dense solid (e.g., box- or disc-shaped), perforated or porous, hollow (e.g., so as to form a chamber), granular, or the like.

Because the reconfigurable pad 14 can be adapted to substantially conform to any workpiece 16 surface contour, the fixture device 10 can be employed for a variety of different workpieces 16, thereby representing a significant commercial advantage in, for example, a flexible manufacturing system that traditionally employed multiple clamps and clamp/supporting member pads specific to individual workpieces 16. For example, significant savings can be obtained by reducing design, engineering, manufacturing, and purchasing of fixture devices for each product type (e.g., dissimilar body panels).

Shape memory materials generally refer to materials or compositions that have the ability to remember their original shape, which can subsequently be recalled by applying an external stimulus (i.e., an activation signal). As such, deformation of the shape memory material from the original shape can be a temporary condition, which can be used for fixturing a variety of workpieces 16 having different surface contours. Exemplary shape memory materials include shape memory alloys (SMAs), shape memory polymers (SMPs), shape memory ceramics (SMCs), baroplastics, composites of the foregoing shape memory materials with non-shape memory materials, and combinations comprising at least one of the foregoing shape memory materials. For convenience and by way of example, reference herein will be made to shape memory alloys and shape memory polymers. The shape memory ceramics, baroplastics, and the like can be employed in a similar manner as will be appreciated by those skilled in the art in view of this disclosure. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than can other shape-memory materials. An example of an SMC is a piezoelectric material.

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). It should be noted that the above-mentioned transition temperatures are functions of the stress experienced by the SMA sample. Specifically, these temperatures increase with increasing stress. In view of the foregoing properties, deformation of the shape memory alloy is preferably at or below the austenite transition temperature (at or below $A_s$). Subsequent heating above the austenite transition temperature causes the deformed shape memory material sample to revert back to its permanent shape. Thus, a suitable activation signal for use with shape memory alloys is a thermal activation signal having a magnitude that is sufficient to cause transformations between the martensite and austenite phases.

The temperature at which the shape memory alloy remembers its high temperature form when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery. The start or finish of the transformation can be controlled to within a degree or two depending on the desired application and alloy composition. The mechanical properties of the shape memory alloy vary greatly over the temperature range spanning their transformation, typically providing shape memory effect, superelastic effect, and high damping capacity. For example, in the martensite phase a lower elastic modulus than in the austenite phase is observed. Shape memory alloys in the martensite phase can undergo large deformations by realigning the crystal structure arrangement with the applied stress, e.g., pressure from a matching pressure foot. As will be described in greater detail below, the material will retain this shape after the stress is removed.

Suitable shape memory alloy materials for fabricating the clamp/supporting member pad include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends on the temperature range where the component will operate.

Reference will now be made to a reconfigurable pad 14 formed of an SMA. To train/set the shape so as to accommodate the contour of the workpiece 16, the reconfigurable pad 14 is pressed against the workpiece 16 with a force ($F_1$) that causes the stresses in the reconfigurable pad 14 to exceed the first yield point of the martensite phase. It should be understood that training or setting the shape of the reconfigurable pad can be done using a so-called "master" article with a shape substantially similar to the workpiece. This master article may be a programmable device that can generate many different surface contours (e.g. a bed-of-nails, wherein the position of each of the nails is programmable).

Figure 1:
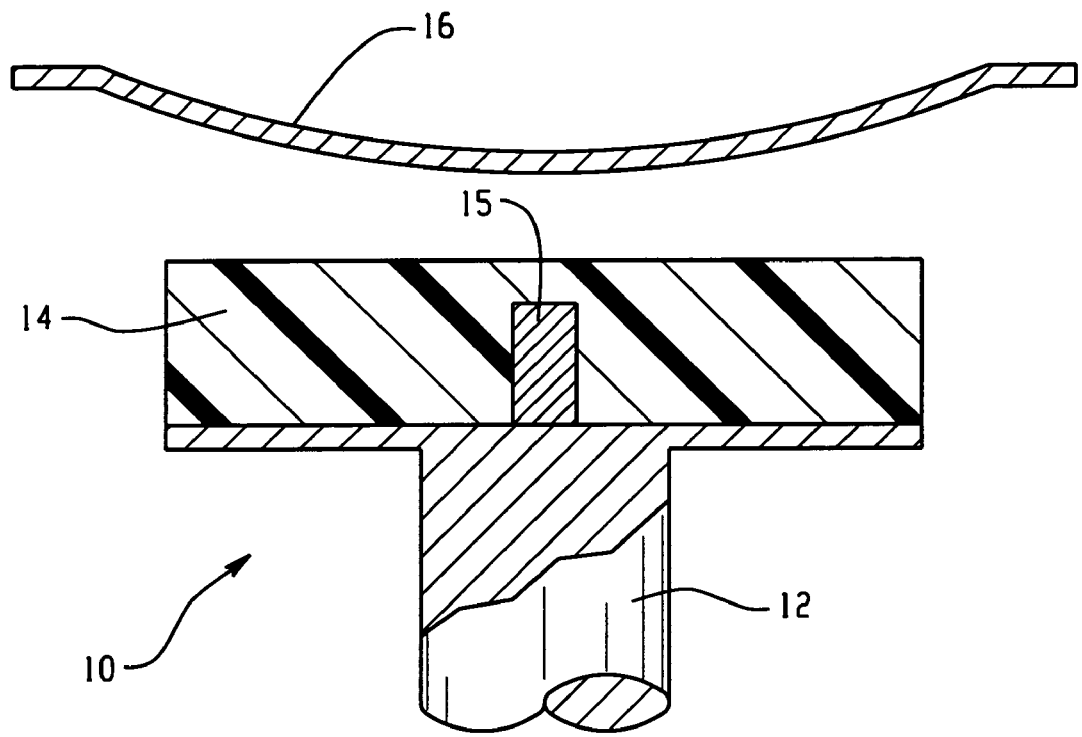
FIG. 1 is a cross sectional view of a fixture device prior to setting the configuration of the reconfigurable pad.
Figure 2:
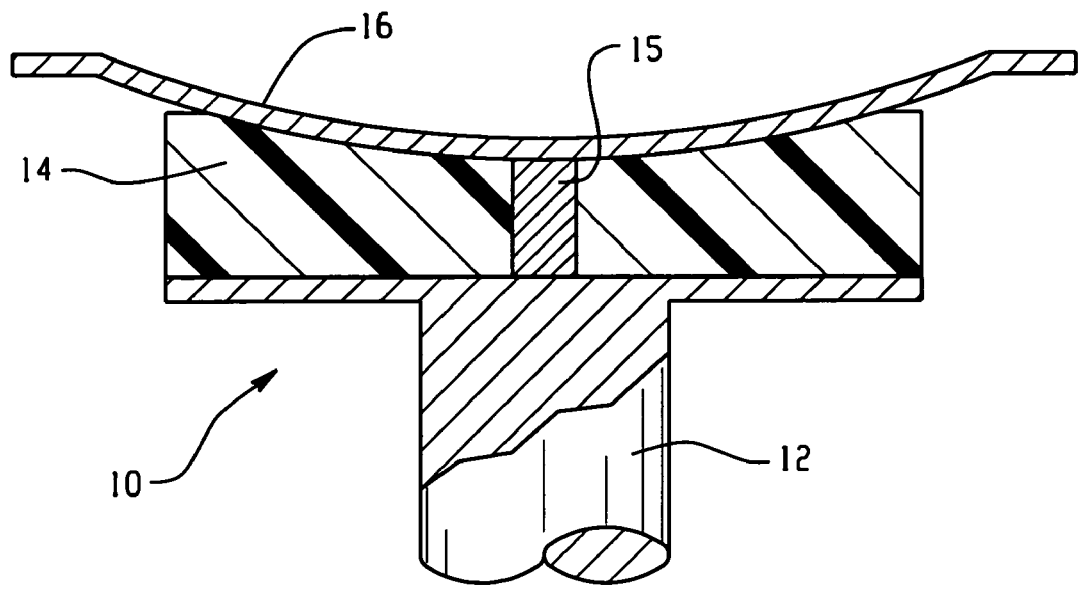
FIG. 2 is a cross sectional view of the fixture device of FIG. 1 during the setting of the configuration of the reconfigurable pad so as to conform to a surface of a workpiece.
Figure 3:
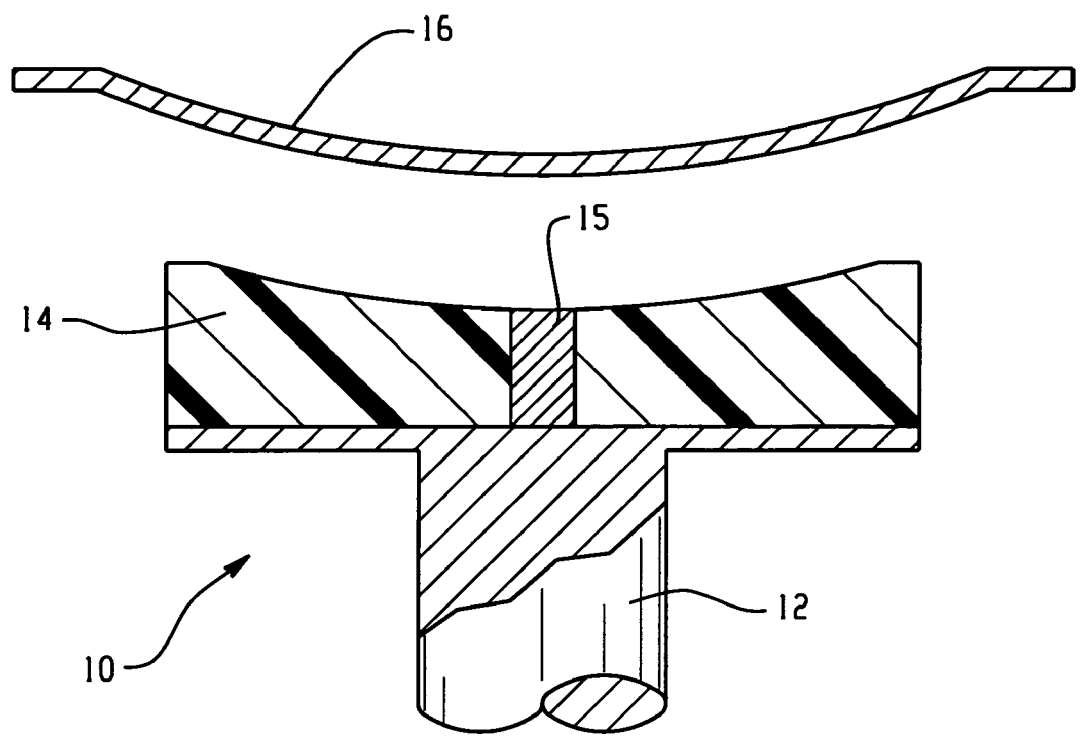
FIG. 3 is a cross sectional view of the fixture device of FIG. 1 upon removal of the workpiece after setting the configuration of the reconfigurable pad.
Figure 4:
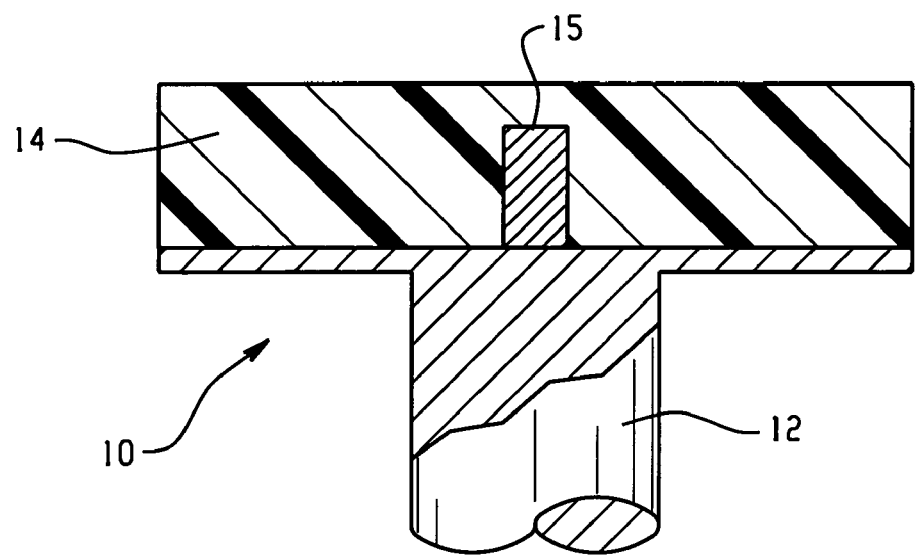
FIG. 4 is a cross sectional view of the fixture device of FIG. 1 after resetting the reconfigurable pad to its original configuration.
Figure 5:
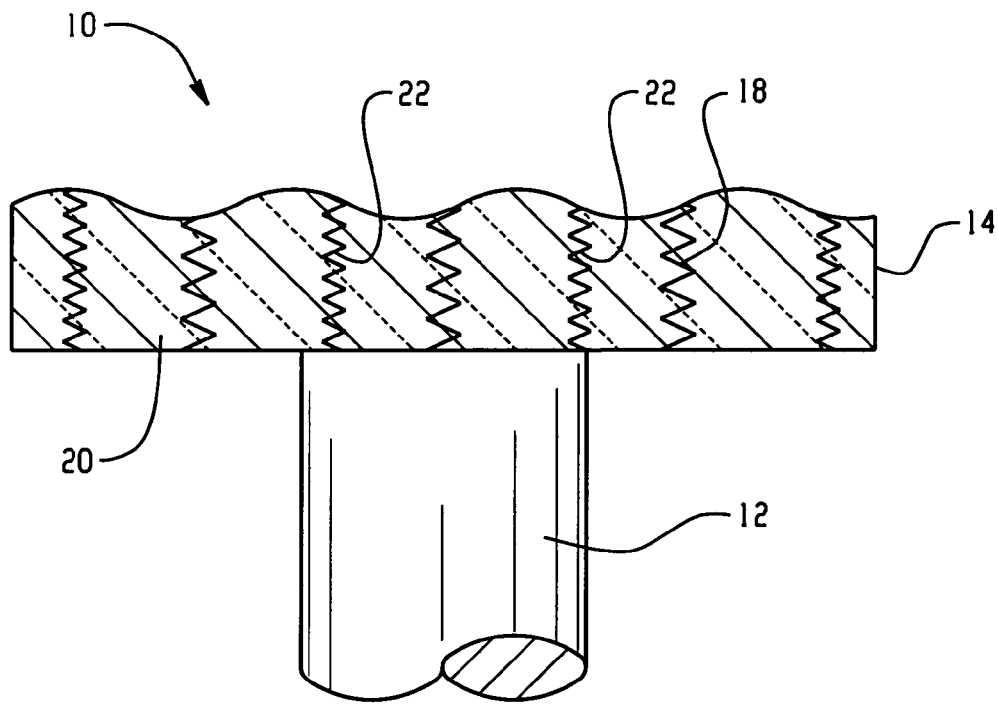
FIG. 5 is a cross sectional view of a fixture device with a composite reconfigurable pad.

The SMA can be in the form of a foam or other structure as may be desired for the particular application, e.g., springs, bands, laminates, and the like, and is not intended to be limited to any particular form or shape. The SMA in the martensite phase undergoes a large, seemingly plastic deformation, at a nearly constant stress. This allows the reconfigurable pad 14 to deform freely in order to conform to the contours of the workpiece 16, as shown in FIG. 2. When the training force (i.e., setting force) is removed, the reconfigurable pad 14 will retain most, if not all, of the deformation produced during the training step, as illustrated in FIG. 3. A small part of the induced deformation may be lost due to elastic recovery.

Although reference has been made to a reconfigurable pad 14 formed of an SMA in the martensite phase, it should be understood that training could occur with a reconfigurable pad 14 formed of the SMA in the austenite phase. In this manner, the SMA behaves similar to a high stiffness rubber-like material. The SMA plastically deforms during the training step as a result of a stress-induced austenite to martensite transformation so as to conform to the workpiece 16 surface. However, unlike the martensitic SMA described in the previous paragraph, the austenitic SMA reconfigurable pad 14 does not retain the deformation induced in it after the training force is removed. Hence, this reconfigurable pad 14 has to be trained for each workpiece 16 of a different shape.

One or more fixture devices 10 with a contoured (i.e., trained) reconfigurable pad 14 are then used to fixture the workpiece 16 in a manner that distributes the reaction force over a large area, and thus, minimizes the possibility of damaging the surface of the workpiece 16. The fixturing force ($F_2$), which is either a support force or a clamp force, during regular use of the reconfigurable pad(s) 14 should, generally, be smaller than $F_1$ such that the stresses induced by $F_2$ do not exceed the first yield point of the martensite phase. Fixturing forces during regular use that are significantly higher than the training forces are also possible if the training step is continued to a point where the stress in the reconfigurable pad(s) 14 increases beyond the first yield point but not beyond the second yield point of the martensite phase SMA. However, it should be noted that the latter approach requires closer control, both during the training step and during regular use to ensure that the conformity between the reconfigurable pad(s) 14 and the support surface on the workpiece 16 is not compromised.

The reconfigurable pad 14 might optionally undergo a reset step before they are reconfigured for fixturing a workpiece 16 at a location with a different surface geometry. In the reset step, the reconfigurable pad 14 is unloaded and heated to a temperature above the austenite-finish temperature of the SMA, and cooled back to the ambient or working temperature as desired. Heating the reconfigurable pad 14 to a temperature above the austenite finish temperature produces a martensite to austenite phase transformation that is accompanied by complete recovery of the seemingly plastic deformation induced during the training step (see FIG. 4) provided that the reconfigurable pad 14 is unloaded, the recovery is not constrained in any manner and sufficient time is allowed for the process. This recovery restores the reconfigurable pad 14 to its original (i.e., undeformed) configuration, which is retained even after it has been cooled. The training process is then repeated for the new workpiece 16 surface geometry. Alternatively, the reconfigurable pad 14 can be trained for the new surface contour directly as opposed to resetting to the original shape(s).

As previously mentioned, other suitable shape memory materials for use in the reconfigurable pad 14 are shape memory polymers (SMPs). "Shape memory polymer" generally refers to a polymeric material, which exhibits a change in a property, such as an elastic modulus, a shape, a dimension, a shape orientation, or a combination comprising at least one of the foregoing properties upon application of an activation signal. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to make the pad conform to a given surface. The maximum strain that the SMP can withstand in this case can, in some embodiments, be comparable to the case when the SMP is deformed above its thermal transition temperature.

Although reference has been, and will further be, made to thermoresponsive SMPs, those skilled in the art in view of this disclosure will recognize that photoresponsive, moisture-responsive SMPs and SMPs activated by other methods may readily be used in addition to or substituted in place of thermoresponsive SMPs. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly (amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly (octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

Reference will now be made to reconfigurable pads 14 formed of a thermoresponsive SMP, which can take any form (e.g., foam, laminate, solid, composite, and the like). The reconfigurable pad 14 made of the SMP is in its stiff, glassy form at the operating temperatures of the fixture device 10, which is below the lowest thermal transition temperature of the SMP. In the training step, the reconfigurable pad 14 is heated to a temperature above the thermal transition temperature, which causes the SMP to transition to a polymeric form having lower stiffness (i.e., decreased flexural modulus properties). The reconfigurable pad 14 is then pressed against the workpiece 16 with a force ($F_1$) and made to deform such that it sufficiently conforms to the contoured surface of the workpiece 16, as shown in FIGS. 2 and 6.

The reconfigurable pad 14 is then cooled below the thermal transition temperature, while still under load (i.e., while holding the configuration attained at the end of the previous step) to bring the SMP back to its stiff glassy form. As illustrated in FIGS. 3 and 7, the reconfigurable pad 14 retains the configuration 'taught' during the training step even after it has cooled down to the regular working temperature and is suitable for use to fixture additional workpieces 16. As the stiffness of the SMP reconfigurable pad 14 is higher when the SMP is in its glassy form than when it is in its soft, polymeric form, the clamping force resisted by the reconfigurable pad 14 can be greater than the training force.

After a fixturing (i.e., supporting and/or clamping) task is completed, the reconfigurable pad 14 can be reheated to a temperature above the thermal transition temperature and pressed against a workpiece 16 for the next task so long as the workpieces have similar surface contours, i.e., the reconfigurable pad(s) 14 can proceed directly to the training step shown in FIGS. 2 and 6. However, in some cases it may be necessary to reset the reconfigurable pad 14 to its original configuration followed by a training step before it can be used to support a workpiece 16 at a location with a different surface geometry. In the optional reset step, the reconfigurable pad 14 is unloaded and heated to above the thermal transition temperature. The reconfigurable pad 14 is held unloaded at that temperature (i.e., with the SMP in the soft, polymeric form), until the reconfigurable pad 14 has regained its original configuration. Since the SMP reconfigurable pad 14 will have a low stiffness, shape recovery may be assisted by external means such as by reorienting the reconfigurable pad 14 to use gravity loading. Other means of shape recovery assistance can include the use of compressed air, immersion in a fluid, use of another material which opposes the SMP within a composite (as will be described below), and the like. When the shape recovery is complete and/or substantially complete, the reconfigurable pad 14 is trained for a new fixturing task.

Composites of a shape memory material and an additional material can also be employed in the reconfigurable pad 14. As stated above, the composite is not intended to be limited to any specific combination of materials. The additional material may be a non-shape memory material and/or an additional shape memory material. The additional shape memory material may be of the same class (e.g., different shape memory polymers), or a different class (e.g. a shape memory polymer and a shape memory alloy).

In one embodiment, if the composite comprises a shape memory polymer and a non-shape memory metal or metal alloy, the non-shape memory material can be configured to provide an assist mechanism to an SMP to facilitate shape change. As an example, such a composite-containing reconfigurable pad 14 may comprise an element 18 distributed within an SMP matrix 20. The element 18 is depicted as a spring in FIG. 5, but may take any shape (e.g., strip, mesh, honeycomb, and the like). The element 18 provides a return mechanism for restoring the reconfigurable pad 14 to its original shape or to the shape of a load under which the reconfigurable pad 14 is placed.

Optionally, if electrically conducting materials form the element 18, these materials can also be used for resistive or inductive heating to effect the phase transformation of the SMP itself.

Optionally, element 18 can be formed of a shape memory material (e.g., an SMA) so as to enable more functionality in the composite. By way of example, SMA materials can be selected to be electrically conducting and have an elastic modulus greater than that of the SMP in both its soft and hard forms. Although other common metals, such as steel and aluminum, also possess these properties, these materials have fully recoverable strains that are smaller than those for SMA materials (e.g., less than about 1% for most metals versus about 8% for some SMA materials). Therefore, a reconfigurable pad 14 made from an SMA-SMP composite can undergo larger fully recoverable deformations than a reconfigurable pad 14 made from an SMP composite reinforced with other metals, provided that the reinforcing component is of the same configuration in both cases. As a consequence, an SMA-SMP composite reconfigurable pad 14 can be configured for a wider variety of fixturing tasks than a composite reconfigurable pad 14 made of SMP and a material with a smaller fully recoverable strain than an SMA (e.g., steel, aluminum, and like non-shape memory materials). Despite the advantages of using SMA over other metals as the second phase in an SMP-based composite, it may be desirable to employ other metals to reduce costs, for example.

In one embodiment, composite reconfigurable pad 14 comprises SMA material distributed throughout a matrix 20 made from the SMP material. The SMA is in close physical (e.g. mechanical and thermal) contact with the surrounding SMP matrix 20.

As an illustrative example, the compositions of the SMA and SMP constituents' of the composite can be chosen such that the various characteristic temperatures for these materials are related by: $T_w < T_{g1} < T_t < A_s < A_f < T_r < M_d, T_{max}$, wherein $T_w$ is the environmental temperature in which the fixture device 10 is disposed and operated; $T_{g1}$ is the first thermal transition temperature of the SMP; $T_t$ is the temperature employed for training (setting is done by cooling to below $T_{g1}$) of the deformed shape; $A_s$ is the austenite start temperature; $A_f$ is the austenite finish temperature; $T_r$ is the temperature employed for recovery of the deformation in the configurable pad 14 to its original shape; $M_d$ is the temperature above which the SMA loses its shape memory properties; and $T_{max}$ is the lesser of the last transition temperature or the oxidation temperature for the SMP material. Consequently, the SMA is in its stress-free martensite phase and the SMP is in its stiff, glassy form at the regular working or operating temperature of the reconfigurable pad 14. Other SMA and SMP compositions could also be used where, for example, the above temperature relationships do not hold. The relationship described above is used in the description that follows, but is by no means intended to be limiting.

In the training step, the reconfigurable pad 14 can be resistively heated by passing current through the SMA element 18. The heating is controlled to raise the temperature of the SMA and the surrounding SMP to $T_t$, which is above $T_{g1}$. The SMA continues to be in the martensite phase as $T_t$ is also lower than $A_s$, at which the martensite to austenite phase transformation is initiated in the SMA. At this stage, the SMP is in its soft, polymeric form and the SMA is still in its lower stiffness martensite phase. The reconfigurable pad 14 is then contacted with the workpiece 16 in order to deform it to conform to the workpiece 16. The SMA also deforms along with the SMP, and depending on the level of stress developed in the SMA, it can undergo either elastic deformation (e.g., less than or equal to about 1% strain) alone or elastic deformation in combination with pseudo-plastic deformation (e.g., up to about 8% strain).

After the reconfigurable pad 14 has achieved sufficient conformance with the workpiece 16, the setting step is initiated. In this step, the current passing through the SMA is switched off and the reconfigurable pad 14 is allowed to cool down to $T_w$, while holding the shape 'taught' during the training step. External cooling may also be used to accelerate this step. As the SMP increases its elastic modulus upon cooling, the SMA has elastic, and possibly pseudo-plastic, strain locked into it. The SMA element 18 within the SMP matrix 20 is chosen such that, for example, the stiffness of its structural form is smaller than that of the SMP matrix 20, while in its stiff glassy form. This ensures that the elastic part of the strain locked into the SMA element 18 does not distort the 'taught' shape to any significant extent. Therefore, the reconfigurable pad 14 retains this 'taught' shape after the setting process is over and the training forces are removed. Maintaining the relative positions of the reconfigurable pad 14 and the workpiece 16 throughout the process can ensure the holding of the trained shape during the setting process. Alternatively, a constant training force, which depends on the response of the reconfigurable pad 14 during the setting process, may be used such that the final shape achieved is the desired one, e.g. the constant force used in the training and setting steps may yield a surface contour that is different from the desired one, but the change in the elastic response of the composite pad, as it is cooled below $T_{g1}$, causes the desired final surface to be produced in the pad at $T_w$. This is conceptually similar to the over-bending done on pressed sheet metal parts to compensate for the change in part geometry due to elastic 'springback'.

When the reconfigurable pad 14 is to be reconfigured for fixturing a workpiece having a different surface contour, it is unloaded and the temperature increased to $T_r$. During this process, the SMP transitions from its stiff, glassy form to a soft, polymeric form, thereby releasing the elastic strain locked into the SMA during the training and setting steps. The elastic recovery force provided by the SMA assists the SMP in reverting to its original configuration. The reconfigurable pad 14 can then be trained for the new workpiece 16. Complete recovery of the original configuration may not be necessary in some cases, and the reconfigurable pad 14 can be trained for the new workpiece 16 immediately after it has been heated to $T_r$.

If the SMA has undergone any pseudo-plastic strain during the training/setting steps and/or the reconfigurable pad 14 needs to be restored to the original configuration before training it for a new workpiece 16, the heating of the unloaded reconfigurable pad 14 is continued until the reset temperature is attained, which is chosen to be greater than $A_f$, which is greater than $T_{g1}$. Heating the SMA above $A_f$ causes the martensite phase to transition to the austenite phase. This phase transition is accompanied by a recovery of the pseudo-plastic strain. Hence, the SMA reverts to its strain-free original configuration. In some embodiments, there may be some unrecovered strain as the number of cycles increases. A significant recovery stress is produced in the SMA during this strain recovery. This stress assists the SMP in recovering its original configuration. When the shape recovery is sufficiently complete, the current flowing through any or all SMA elements 18 is adjusted to a level that brings the temperature of the reconfigurable pad 14 to $T_t$. The reconfigurable pad can now be trained for the next workpiece 16.

Optionally, if the SMA is sheathed in a thermally insulating cover, but continues to be in close mechanical contact with the SMP, the shape memory effect can still be used to aid in the shape recovery of the reconfigurable pad 14 during the reset step. The only deviation from the procedure described above would be that current is not passed through the SMA elements for heating. A different heat source would be used during the training and reset steps. This results in a less complex temperature relationship ($T_w < T_{g1} < T_t \leq T_r < T_{max}$), which translates into greater freedom in choosing the SMA and SMP components.

In another embodiment, the SMA can be used for resistive heating and super-elastic reset. In this embodiment, the super-elastic behavior of the SMA component is used to allow the reconfigurable pad 14 to undergo large deformations during the training step, which are fully recoverable during the reset step. The elastic recovery forces exerted by the super-elastic SMA component help the reconfigurable pad 14 to recover its original configuration when it needs to be reconfigured for supporting a workpiece 16 at a location with a different surface geometry.

In one embodiment, the reconfigurable pad 14 can comprise an SMA element 18 in the austenite phase distributed within an SMP material. The SMP material is in its stiff, glassy form at the regular working temperature. The SMA and SMP are in close physical (i.e., mechanical, thermal, and the like) contact; the compositions of which are chosen such that their characteristic temperatures are related in the following relationship: $A_f < T_w < T_{g1} < T_t \leq T_r < M_d$, $T_{max}$.

In the training step, the reconfigurable pad 14 is heated to $T_t$, where the SMP transforms into its soft, polymeric form while the SMA remains in its austenite phase. The reconfigurable pad 14 is then pressed against the workpiece 16 and deformed to make it conform to the surface contour particular to the workpiece 16. The soft, polymeric SMP deforms easily and can undergo large strains (e.g. up to 200%). Initially, the SMA deforms elastically, but later if the stress in the SMA material exceeds a critical stress ($\sigma_m$), the SMA undergoes a pseudo-plastic deformation. The SMA can undergo large recoverable strains (e.g., up to about 8%) at nearly constant stress during the pseudo-plastic deformation, which is associated with a stress-induced austenite to martensite phase transformation in the SMA material.

After the desired conformity between the reconfigurable pad 14 and the workpiece 16 is achieved, the reconfigurable pad 14 is allowed to cool down to $T_w$, while holding the shape 'taught' during the training step. Other cooling methods (e.g., air jet) may be used to assist and/or accelerate the cooling process as desired. When the temperature drops below $T_{g1}$, the SMP transforms into its stiff, glassy form, thereby locking the strain (elastic and, possibly, pseudo-plastic) in the SMA. As discussed earlier, the SMA element 18 within the SMP matrix 20 can be chosen such that its stiffness is smaller than that of the SMP matrix 20 in its stiff glassy form. Consequently, the reconfigurable pad 14 retains the 'taught' shape at $T_w$, and is ready for use.

When the reconfigurable pad 14 needs to be reconfigured to support another surface, it is unloaded and heated to $T_r$, which is above $T_{g1}$. As the elastic modulus of the SMP decreases, the elastic and pseudo-plastic strain locked into the SMA is gradually recovered. The SMA exerts elastic restoring forces on the surrounding SMP that can assist the SMP in recovering its original configuration. It should be noted that recovery of the original configuration is optional and, in some embodiments, the reconfigurable pad 14 can be directly taken to the training step for the next workpiece 16 after it has been heated to $T_r$.

In yet another embodiment, the SMA can be adapted for heating, actuation, and reset. In this embodiment, at the regular working or operating temperature, the reconfigurable pad 14 comprises pseudo-plastically strained SMA material in the martensite phase distributed within a stiff, glassy SMP matrix. The SMA and SMP components of the reconfigurable pad 14 are in close physical contact (e.g. mechanical, thermal, and the like) and their composition is chosen such that the characteristic temperatures are related as follows: $T_w < T_{g1}$, $M_f < T_t \leq T_r < A_s < T_a$, $A_f < T_{max}$, $M_d$. In this embodiment, the composite includes at least two different SMA elements 18 and 22, shown in FIG. 5, wherein SMA element 18 is selected to be antagonistic to SMA element 22. That is, SMA element 18, on actuation, will seek to deform the SMP matrix 20 in a direction opposite to that of the element 22. SMA elements 18 and 22 are distributed throughout the SMP matrix 20.

In the training step, the reconfigurable pad 14 is heated to $T_t$, which is greater than $T_{g1}$. As a consequence, the SMP transitions to its soft, polymeric form. However, the SMA remains in the martensite phase because $T_t$ is lower than $A_s$, at which the martensite to austenite phase transition is initiated in the SMA. A subset of the SMA elements 18 and/or 22 in the reconfigurable pad 14 is selectively actuated by heating the subset such that these elements are heated to their actuation temperature. Heating the selected subset of the pre-strained martensite phase SMA elements above $A_s$ initiates the martensite to austenite phase transition in these elements. As a consequence of this transformation, the activated SMA elements 18 and/or 22 attempt to revert to their strain-free configuration and, in this process, exert force on the surrounding SMP matrix 20 and other SMA elements 18 and/or 22. Note that the strain-free configuration for the SMA elements is not the same as the configuration of these elements in the original configuration of the reconfigurable pad 14 because the SMA elements are pre-strained in the latter configuration. The elements 18 and/or 22 forming the actuated subset are chosen such that, as a consequence of actuating this subset, the reconfigurable pad 14 deforms into a geometry that is suitable for fixturing the given workpiece 16.

While it may be desirable to achieve the required geometry entirely by using SMA actuation, an assist can also be provided to fine tune the desired final geometry. For example, a further mechanical step, in which the partially trained reconfigurable pad 14 is pressed against a training surface at a temperature above $T_{g1}$, may be used. This is especially desirable if close tolerances are desired on the contoured surface. The work required in the mechanical training step is less in this case than if the entire deformation of the reconfigurable pad 14 was to be done by pressing the reconfigurable pad 14 against the training surface. As the SMP material is in its soft, polymeric form, the actuation force obtained from the SMA elements can easily deform it. The non-actuated SMA elements, which are in the martensite phase, undergo pure elastic deformation initially, but can deform pseudo-plastically if the stress in these elements exceeds the first yield stress of the martensite phase. The elastic deformation is limited to small fully recoverable strains (e.g., less than about 1%), but the pseudo-plastic deformation can accommodate much larger fully recoverable strains (e.g., up to about 8%).

After the reconfigurable pad 14 conforms sufficiently to the training surface (e.g., workpiece 16), it is cooled to $T_w$, while holding the configuration attained at the end of the training step. This is achieved for example by switching off a current passing through only those SMA elements that are not actuated in the training step. Other cooling means may also be used to assist and/or accelerate this process. The actuation current passing through the actuated SMA elements may be adjusted in keeping with the changing modulus of the SMP matrix such that the surface contour 'taught' during the training step is reasonably unchanged until the bulk of the SMP material has transformed back to its stiff, glassy form. The actuation current is then switched off and the actuated elements are cooled down to $T_w$. The 'taught' shape is held during the secondary mechanical training step, if used, by maintaining the relative position of the training surface until the SMP has glassified. Other alternatives discussed earlier to hold the 'taught' shape during the setting step can also be used. At the end of the setting process, the reconfigurable pad 14 retains the shape 'taught' during the training step and is ready for use. In this condition, the SMA elements (actuated or not) have some elastic, and possibly some pseudo-plastic strain.

When the reconfigurable pad 14 needs to be reconfigured for another workpiece 16, it can be heated to $T_r$. During this process, the SMP material transforms into its soft, polymeric form as $T_r$ is greater than $T_{g1}$. The elastic strain locked in the SMA elements (actuated or not) is gradually released during the softening of the SMP. The accompanying elastic recovery forces help in restoring the reconfigurable pad 14 to the original configuration. If complete recovery of the original shape is not desired, the heated reconfigurable pad 14 can be directly trained for the next workpiece 16.

In the event that the shape recovery obtained in the above process is insufficient for the reconfigurable pad 14 to be trained for a new workpiece 16, the shape recovery process can be continued. If any SMA elements have undergone pseudo-plastic deformation during the training/setting steps, that strain cannot be recovered by heating the reconfigurable pad 14 to $T_r$. In this case, the set of SMA elements (20 or 22), which are antagonistic to those actuated in the training step, is actuated while the reconfigurable pad 14 is held at $T_r$. The actuation force exerted on the reconfigurable pad 14 by these elements (20 or 22), as they undergo the martensite to austenite phase transition helps the reconfigurable pad 14 recover its original configuration. After the shape recovery is sufficiently complete, the reconfigurable pad 14 can be trained for the next workpiece 14.

In yet another embodiment, the SMA can be adapted to provide heating, actuation and reset by means of a two-way shape memory effect. In this embodiment (see FIG. 5), at the working temperature, the reconfigurable pad 14 comprises SMA element 18 distributed within the stiff, glassy SMP matrix 20. The SMA material is in the martensite phase and has been processed to allow the SMA element 18 to 'remember' two shapes: a high temperature shape, which is the natural shape of the element when the SMA is fully austenitic; and a low temperature shape, which is the natural shape when the material is fully martensitic. The SMA and SMP materials are in close physical (e.g., mechanical, thermal) contact and their composition is chosen such that the characteristic temperatures are related as follows: $T_w<M_f<M_s<T_{g1}<T_t\leq T_r<A_s<T_a\leq A_f<T_{max},M_d$.

In the training step, the reconfigurable pad 14 is heated to $T_t$, which is greater than $T_{g1}$. As a consequence, the SMP transitions to its soft, polymeric form. The reconfigurable pad 14 can be heated, for example, by passing current through all of the SMA elements 18. Other heating methods may also be used to assist and/or accelerate the heating process. A subset of the SMA elements 18 in the reconfigurable pad 14 can then be actuated by heating them to the appropriate actuation temperature. This selective actuation can be obtained, for example, by increasing the current passing through those elements 18. Heating the martensite phase SMA elements 18 to a temperature above $A_s$ initiates a martensite to austenite phase transition in those elements 18. As a consequence of this transformation, the actuated SMA elements 18 try to attain their high temperature shape, and in the process exert force on the surrounding SMP matrix 20 and other SMA elements 18. The elements 18 forming the actuated set are chosen such that actuating this set deforms the reconfigurable pad 14 into a geometry that is suitable for the given workpiece 16.

While it is desirable to achieve the required geometry entirely by using SMA actuation, it is only necessary that the actuation achieve a geometry that is in the neighborhood of the desired one. A further mechanical step, in which the partially trained reconfigurable pad 14 is pressed against a training surface at a temperature above $T_{g1}$, may be used to obtain the geometry necessary for the given workpiece 16. The work required in the mechanical step is less in this case than if the entire deformation of the pad were to be done by pressing the reconfigurable pad 14 against the training surface. As the SMP material is in its soft, polymeric form, the actuation force obtained from the SMA elements 18 can easily deform it. The non-actuated SMA elements 18 remain in the martensite phase throughout the training process and undergo purely elastic deformation initially, but can deform pseudo-plastically if the stress in these elements 18 exceeds the first yield stress of the martensite phase. The elastic deformation is limited to small fully recoverable strains (e.g., less than about 1%), but the pseudo-plastic deformation can accommodate larger fully recoverable strains (e.g., up to about 2%).

After the reconfigurable pad 14 conforms sufficiently to the training surface with the desired geometry, it is cooled to $T_w$, while holding the configuration attained at the end of the training step. This is achieved, for example, by switching off the current passing through only those SMA elements 18 that are not actuated in the training step. As in the various other embodiments, alternative cooling means may also be used to assist and/or accelerate this process. The actuation current passing through the actuated SMA elements 18 is adjusted to prevent or minimize the deviation of the surface from the 'taught' shape until the bulk of the SMP material has transformed back to its stiff, glassy form. This may result in the temperature of these elements 18 remaining above $A_f$, and hence the actuated elements 18 continue to strive to attain their high temperature shape, while the bulk of the SMP matrix 20 is glassifying. The actuation current is then switched off and the actuated elements 18 are cooled down to $T_w$. The 'taught' shape is held by keeping the elements 18 actuated, and if a secondary mechanical training step is used, by keeping the reconfigurable pad 14 pressed against the training surface until the SMP has glassified. When the temperature of the actuated SMA elements 18 drops below the martensite-start temperature ($M_s$) during the cooling process, the austenite in the SMA begins to transform to martensite. This transformation is accompanied by these elements attempting to revert back to their low temperature shape. However, as $M_s<T_{g1}$, the surrounding SMP matrix 20 has glassified before the austenite to martensite phase transformation and the associated shape change can take effect. Consequently, the reconfigurable pad 14 retains the shape 'taught' during the training step at the conclusion of the setting process and is ready for use. In this condition, the SMA elements 18 (actuated or not) have some elastic, and possibly some pseudo-plastic, strain locked therein.

When the reconfigurable pad 14 needs to be reconfigured for supporting a workpiece 16 at a location with a different surface geometry, the pad can be heated to the $T_r$ by passing current through all of the SMA elements 18, for example. As $T_r$ is greater than $T_{g1}$, the SMP material transforms into its soft, polymeric form. The elastic strain locked in the SMA elements (actuated or not) is gradually released during the softening of the SMP. The accompanying elastic recovery forces help in restoring the pad to its original configuration.

As described above, complete recovery of the original shape is not necessary, and the heated reconfigurable pad 14 can be trained for the next fixturing task after the SMP matrix 20 has softened sufficiently. In the event that the shape recovery obtained in the above process is insufficient, the shape recovery process needs to be continued. If any SMA elements 18 have undergone pseudo-plastic deformation during the training and setting steps, that strain cannot be recovered by simply heating the reconfigurable pad 14 to $T_r$. In this case, the SMA elements 18 that have undergone pseudo-plastic deformation are heated to the actuation temperature (e.g., by increasing the current passing through these elements), while the rest of the reconfigurable pad 14 is held at about $T_r$. In doing this, the elements 18 are able to undergo the martensite to austenite phase transition, and their temperature can subsequently be reduced to $T_r$. The reconfigurable pad 14 is now ready to be reconfigured for the next fixturing task.

Although reference has been made to using an electric current to heat the shape memory material of the reconfigurable pad 14 of the fixture device 10, various other methods can be employed to effect the temperature changes used for the various phase transformations described above. For example, heating of the reconfigurable pad 14 can be effected by dipping or exposing it or the entire fixture device 10 to heated fluids (liquids and/or gasses); by inductive heating when electrically conductive materials are employed; by exposing it to incident laser light; by thermoelectric heating; by microwave heating; by infrared heating; by flash lamps; and the like. In a similar manner, various means of cooling the reconfigurable pad 14 include, but are not intended to be limited to, dipping or exposing the reconfigurable pad 14 or the entire fixture device 10 to cooled fluids; thermoelectric cooling; and the like.

Alternatively, to increase heating and cooling transfer efficiency two fixture devices 10 can be employed, wherein one fixture device 10 is in a so-called "stand-by" mode (or trained for a second workpiece 16) and the other is employed for a given workpiece 16. Still further, different types of SMA elements 18 and/or 22 can be employed wherein one subset of elements 18 (or 22) has a different phase transformation temperature than the other subset of elements 22 (or 18).

Reference will now be made to use of a thermoelectric device for heating and/or cooling the reconfigurable pad 14 of the fixture device 10. A thermoelectric device is a solid-state electronic component that can emit or absorb heat upon the passage of a current across the device, or vice versa. To generate heat differences, a thermoelectric device relies on the Peltier effect, which occurs when a current is passed through a pair of dissimilar conductors connected in a closed loop. The current drives a transfer of heat from one junction of the two dissimilar conductors to the other. The conductors, which can be semiconductors, metals, ionic conductors, or the like, attempt to return to the charge equilibrium that existed before the current was applied by absorbing energy at one junction and releasing it at the other (i.e., one junction cools off while the other heats up). Additional couples (pairs of dissimilar conductors) can be connected in series to enhance this effect. The direction of heat transfer is controlled by the polarity of the current, (i.e., reversing the polarity will change the direction of transfer and thus whether heat is absorbed or emitted).

An exemplary thermoelectric device comprises an array of couples sandwiched between two substrates. Each couple comprises one n-type and one p-type semiconductor. The couples are configured such that they are connected electrically in series, and thermally in parallel. The two substrates, which provide the platform for the connected couples, may be metals or metallized ceramics to facilitate heat transfer. A thermoelectric device may function singularly or in groups with series, parallel or series/parallel electrical connections depending on the desired level of heat transfer needed to activate the particular shape memory material of the reconfigurable pad 14.

The same semiconductor composition can be doped to form both members of the couple or two different semiconductor compositions can be used. A good semiconducting thermoelectric material is measured by its "figure of merit" or ZT, wherein T is the temperature and Z is defined as:

$$Z=S^2/\rho K$$

wherein S is the Seebeck coefficient (ratio of the open-circuit voltage to the temperature difference between the hot and cold junctions of a circuit), $\rho$ is the electrical resistivity, and K is the thermal conductivity. Desirably, the semiconductor has a ZT greater than or equal to about 0.5 at the given training temperature for the particular shape memory material used in the reconfigurable pad 14. Semiconducting materials suitable for use with the fixture devices disclosed herein include alloys of lead, bismuth, and/or antimony with tellurium and/or selenium (e.g., $Bi_2Te_3$, PbTe, SbTe, BiSb, $Bi_{1.5}Sb_{0.5}Te_3$, PbSeTe, and the like); $CsBi_4Te_6$; SiGe; MnTe; filled skudderudites (e.g., $CeFe_4Sb_{12}$ and the like); $XeIr_4Sb_{12}$, $Sr_8Ga_{16}Ge_{30}$; Chevrel compounds (e.g., $Cu_{3.1}Mo_6Se_8$, $Cu_{1.38}Fe_{0.66}Mo_6Se_8$, and $Ti_{0.9}Mo_6Se_8$, and the like); and the like. One skilled in the art in view of this disclosure can determine which compositions would be appropriate for use in the fixture device 10 based on the particular shape memory materials of the reconfigurable pad 14. For example, $Bi_2Te_3$ has a ZT of 1.0 at 300 degrees Kelvin (K) and PbTe has a ZT of 0.9 at 500 K, both of which may be used with an SMP- or SMA-based reconfigurable pad 14.

Figure 8:
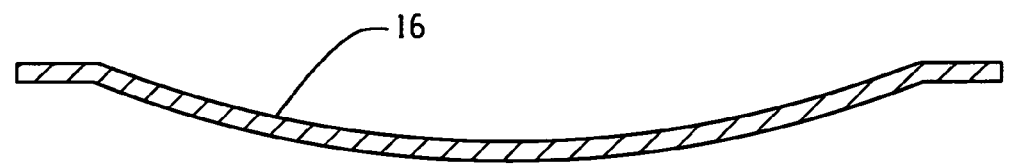
FIG. 8 is a cross sectional view of a fixture device employing a thermoelectric unit in accordance with one embodiment.
Figure 8:
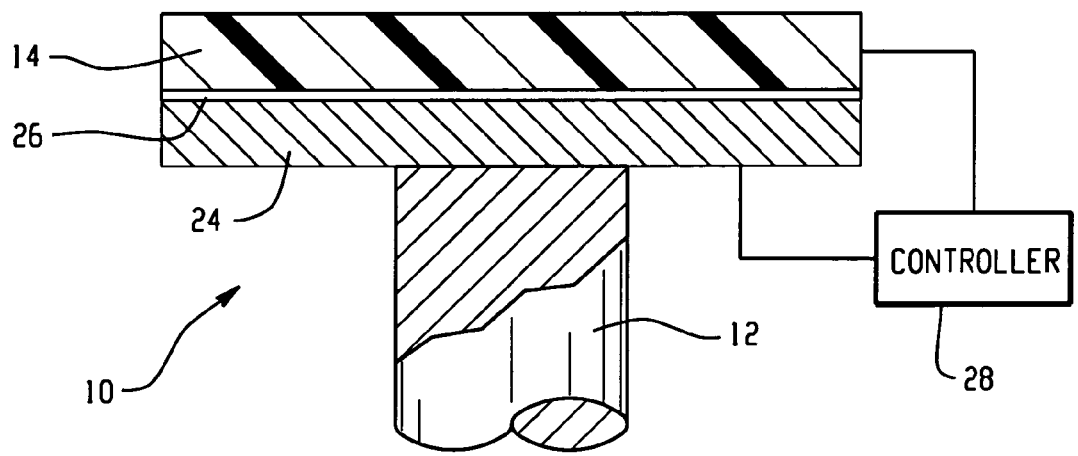

A fixture device 10 incorporating a thermoelectric unit in operative communication with the reconfigurable pad 14 is shown in FIG. 8. The thermoelectric unit 24 is interposed between the base member 12 and the reconfigurable pad 14. A controller (e.g., a power supply) 28 is in electrical communication with the thermoelectric unit 24. Optionally, the controller 28 may include a temperature-measuring device (e.g., a thermocouple) in operative communication with the thermoelectric unit 24 and/or the reconfigurable pad 14 as a means of providing feedback to the controller 28.

An optional adhesion layer 26 may be used to further improve the bonding strength between the reconfigurable pad 14 and the thermoelectric unit 24. Suitable materials for use in the adhesion layer 26 include electrically conductive polymer adhesives, metallic films (e.g., titanium, chromium, alloys comprising titanium or chromium, and the like), organosilane compounds, and the like.

In operation of a fixture device 10 that makes use of a thermoelectric unit 24, a current is passed through the thermoelectric unit 24 in a first direction effective to heat the shape memory material of the reconfigurable pad 14 to the training temperature. The reconfigurable pad 14 is then pressed against the workpiece 16 with a force ($F_1$) and made to deform such that it sufficiently conforms to the contoured surface of the workpiece 16, as shown in FIGS. 2 and 6.

The reconfigurable pad 14 is then cooled below the training temperature by reversing the direction of the current passed through the thermoelectric unit 24. At this point, as illustrated in FIGS. 3 and 7, the reconfigurable pad 14 retains the configuration 'taught' during the training step even after it has cooled down to the regular working temperature and is suitable for fixturing workpieces 16 having the trained configuration. The next training step, or a reset step, can be carried out by passing a current through the thermoelectric unit 24 in the first direction again effective to heat the shape memory material of the reconfigurable pad 14 to the training temperature.

In an advantageous feature of using a thermoelectric unit 24, a temperature gradient in the shape memory material may be established (e.g., by reversing the direction of the current), while it is in the heated state (i.e., at or above the training temperature) but before the reconfigurable pad 14 is brought in contact with the training surface. This temperature gradient desirably results in a higher temperature on the surface of the reconfigurable pad 14 to be trained, and a lower temperature on an inner (i.e., interior to the surface to be trained) portion. In this manner, the colder portion of the shape memory material, and thus the reconfigurable pad 14, retains its shape and rigidity while the hotter portion is trained under compression. The temperature gradient permits appropriate temperature control, which can be beneficial if the reconfigurable pad 14 and training surface have different thermal masses and temperatures. For example, establishing the temperature gradient can help prevent melting or delamination/separation of a shape memory polymer reconfigurable pad 14 from the base member 12.

Figure 9:
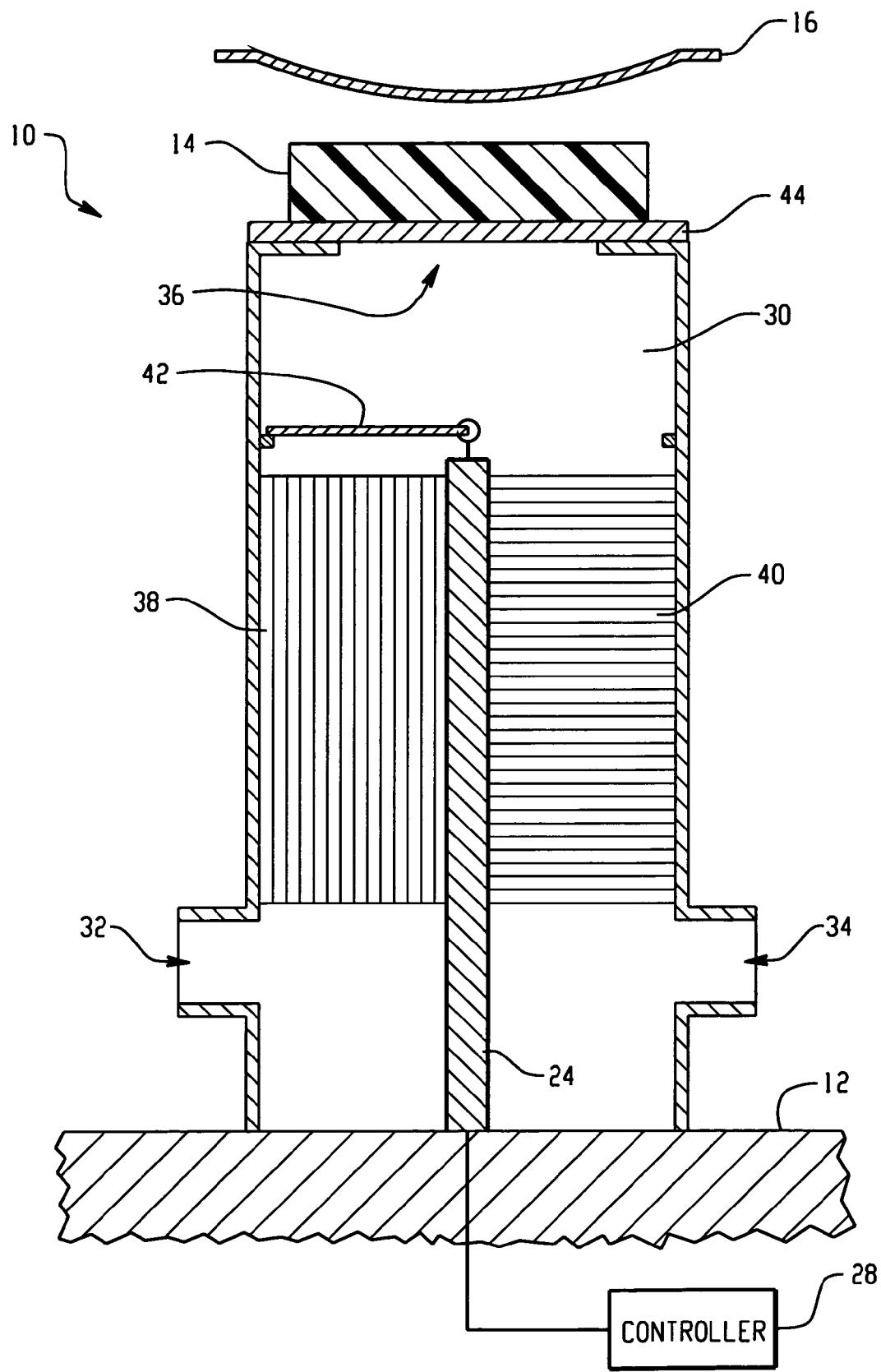
FIG. 9 is a cross sectional view of a fixture device employing a thermoelectric unit in accordance with another embodiment.

Another fixture device 10 incorporating a thermoelectric unit 24 is shown in FIG. 9. The fixture device 10 includes a chamber 30 interposed between the reconfigurable pad 14 and the base member 12. The chamber 30 includes an inlet 32 (in this embodiment two inlets 32 and 34) and an outlet 36 through which air may flow. The thermoelectric unit 24, which is in electrical communication with the controller 28, is disposed inside the chamber such that two portions are defined by the thermoelectric unit 24. On one side of the thermoelectric unit 24 is a heat sink 38, and on an opposite side of the thermoelectric unit is a cold sink 40. The heat sink 38 and the cold sink 40 are downstream of the inlets 32 and 34. The reconfigurable pad 14 is disposed on the chamber outlet 36.

In operation of the fixture device 10 shown in FIG. 9, a current is passed through the thermoelectric unit 24 effective to heat the heat sink 38 (and in turn cool the cold sink 40). Air, which is forced through the chamber 30 via chamber inlet 32, is heated by the heat sink 38 and exits the chamber outlet 36 where it contacts the reconfigurable pad 14. Once the shape memory material of the reconfigurable pad 14 is heated to the training temperature, the reconfigurable pad 14 can be pressed against the workpiece 16 with a force ($F_1$) and made to deform such that it sufficiently conforms to the contoured surface of the workpiece 16, as shown in FIGS. 2 and 6.

The reconfigurable pad 14 is then cooled below the training temperature while still under $F_1$. The reconfigurable pad 14 can be naturally cooled by shutting off the air supply to the chamber inlet 32 and discontinuing the current passing through the thermoelectric unit 24. Alternatively, the reconfigurable pad 14 can be cooled by shutting off the air supply to chamber inlet 32, and forcing air through the chamber 30 via chamber inlet 34 where it is cooled by the cold sink 40 and exits the chamber outlet 36 to contact the reconfigurable pad 14. At this point, as illustrated in FIGS. 3 and 7, the reconfigurable pad 14 retains the configuration 'taught' during the training step even after it has cooled down to the regular working temperature and is suitable for fixturing workpieces 16 having the trained configuration. The current passing through the thermoelectric unit 24 and any air flowing through the chamber 30 can be discontinued after the training step. Subsequent training steps can be performed in a similar fashion.

In one embodiment, the fixture device 10 may further comprise a valve (e.g., a check valve or a flapper valve) 42, which is downstream of the thermoelectric unit 24, heat sink 38, and cold sink 40. The valve can prevent air, while being forced through the chamber 30, from flowing into one inlet, across the chamber, and out through the other inlet.

In another embodiment, the fixture device 10 may further comprise a perforated plate 44 disposed between the chamber outlet 36 and the reconfigurable pad 14. The perforated plate 44 provides an additional support structure for the reconfigurable pad 14 to rest upon, while permitting air to flow from the chamber 30 to heat or cool the reconfigurable pad 14.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A process, comprising:
    conforming a reconfigurable pad of a fixture device to a surface of at least one workpiece; the fixture device also comprising a base member having the reconfigurable pad disposed thereon, wherein the reconfigurable pad comprises a shape memory material configured to conform to the surface of the at least one workpiece;
    contacting the surface of the at least one workpiece with the reconfigurable pad of the fixture device; and
    fixturing the contacted workpiece.

2. The process of claim 1, wherein the conforming comprises: activating the shape memory material; applying a force to the reconfigurable pad effective to deform the reconfigurable pad from an original shape to a shape conforming to the surface of the workpiece or a training surface; and deactivating the shape memory material.

3. The process of claim 2, wherein activating the shape memory material comprises applying at least one of heat, moisture, and light to the shape memory material, and wherein deactivating the shape memory material comprises discontinuing the at least one of the heat, the moisture, and the light.

4. The process of claim 3, wherein applying the heat comprises resistive heating, contacting a heated fluid, inductive heating, microwave heating, exposing to laser light, thermoelectric heating, microwave heating, infrared heating, exposing to a flash lamp, convective heating, or a combination comprising at least one of the foregoing.

5. The process of claim 3, wherein deactivating the heat comprises removing a heating source, free convective fluid cooling, forced convective fluid cooling, contacting a cooled fluid, thermoelectric cooling, or a combination comprising at least one of the foregoing.

6. The process of claim 1, further comprising resetting the reconfigurable pad to the original shape after the fixturing.

7. The process of claim 6, wherein the resetting comprises activating the shape memory material without an applied load.

8. The process of claim 1, further comprising resetting the reconfigurable pad to a different shape corresponding to a surface of at least one different workpiece.

9. The process of claim 1, wherein the fixturing comprises supporting the workpiece in a fixed position.

10. The process of claim 1, wherein the contacting comprises disposing the workpiece between the reconfigurable pad of the fixture device and an other pad of the fixture device, and the fixturing comprises clamping the workpiece in a fixed position.

11. The process of claim 10, wherein the other pad of the fixture device comprises a shape memory material configured to conform to another surface of the at least one workpiece.

12. The process of claim 10, further comprising conforming the other pad of the fixture device to the other surface of the workpiece prior to the contacting.

13. The process of claim 1, further comprising using a locating pin disposed on the base member either within or adjacent to the reconfigurable pad, or a combination thereof, to provide information regarding location of the workpiece.

14. A process for conforming a reconfigurable pad of a fixture device to a surface of at least one workpiece, the fixture device also comprising a base member having the reconfigurable pad disposed thereon, the process comprising:
    heating the reconfigurable pad effective to increase a temperature of a shape memory material to or above a shape setting temperature;
    applying a force to the reconfigurable pad effective to deform the reconfigurable pad from an original shape to a shape conforming to the surface of the at least one workpiece; wherein the applying the force comprises contacting a master article with a shape substantially similar to the workpiece to the heated reconfigurable pad; and
    cooling the shape memory material below the shape setting temperature.

15. The process of claim 14, wherein the cooling comprises removing a heating source, free convective fluid cooling, forced convective fluid cooling, contacting a cooled fluid, thermoelectric cooling, or a combination comprising at least one of the foregoing.

16. The process of claim 14, wherein the heating comprises resistive heating, contacting a heated fluid, inductive heating, microwave heating, exposing to laser light, thermoelectric heating, microwave heating, infrared heating, exposing to a flash lamp, convective heating, or a combination comprising at least one of the foregoing.

17. The process of claim 14, wherein the applying comprises contacting the workpiece to the heated reconfigurable pad.

* * * * *